US012697924B2

(12) United States Patent
Huth et al.

(10) Patent No.: US 12,697,924 B2
(45) Date of Patent: Aug. 4, 2026

(54) ELECTRONIC UNIT FOR A VEHICLE AND MANUFACTURING METHOD

(71) Applicant: Continental Automotive Technologies GmbH, Hannover (DE)

(72) Inventors: Tobias Huth, Langenselbold (DE); Thomas Schaper, Mosbach (DE); Jörg Thomas, Dietzenbach (DE); Doris Schäfer, Offenbach am Main (DE); Sergej Wittmeier, Münster (DE); David Saar, Groß-Umstadt (DE)

(73) Assignee: Continental Automotive Technologies GmbH, Hannover (DE)

( * ) Notice: Subject to any disclaimer, the term of this patent is extended or adjusted under 35 U.S.C. 154(b) by 231 days.

(21) Appl. No.: 18/369,395

(22) Filed: Sep. 18, 2023

(65) Prior Publication Data

US 2024/0092275 A1       Mar. 21, 2024

(30) Foreign Application Priority Data

Sep. 19, 2022    (DE) ..................... 10 2022 209 810.2

(51) Int. Cl.
*B60R 11/00*             (2006.01)
(52) U.S. Cl.
CPC ....... *B60R 11/00* (2013.01); *B60R 2011/0052* (2013.01)
(58) Field of Classification Search
CPC ........ B60R 2011/077; G02F 2201/501; H05K 5/0217; H05K 5/30; G09F 9/3026; F16M 11/041
See application file for complete search history.

(56) References Cited

U.S. PATENT DOCUMENTS 11,011,084 B1 *    5/2021   Hemphill .............. G09F 9/3026
2016/0165745 A1    6/2016   Choi et al.
(Continued)

FOREIGN PATENT DOCUMENTS

DE       102014019293 A1     6/2016
DE       202018002037 U1     5/2018
(Continued)

OTHER PUBLICATIONS

Machine Translation for WO2014102467A1 (Year: 2025).*
(Continued)

*Primary Examiner* — Allen L Parker
*Assistant Examiner* — Peter Krim
(74) *Attorney, Agent, or Firm* — COZEN O'CONNOR

(57)                ABSTRACT

An electronic unit for a vehicle, comprising surface elements arranged next to one another with a visible surface side and a surface underside is disclosed. The surface elements are fixed in a housing. The housing has a top side facing the surface underside and an underside, wherein a carrier plate is provided. Each housing on its underside has at least one protruding fixing element for fixing the surface elements to the carrier plate. The carrier plate connects the surface elements together, wherein each fixing element has an index element arranged on the fixing element between the carrier plate and the underside and is releasably connected to the fixing element. The index elements are connected to the carrier plate by substance bonding so each surface element is releasably fixed to the carrier plate, and wherein by the index elements, the surface elements are arranged relative to and level with one another.

16 Claims, 3 Drawing Sheets

(56) References Cited

U.S. PATENT DOCUMENTS

| | | | |
|---|---|---|---|
| 2019/0008056 A1 | 1/2019 | Krell | |
| 2021/0378384 A1* | 12/2021 | Lee | A45D 40/04 |
| 2022/0198969 A1* | 6/2022 | Wang | G09F 9/3026 |
| 2023/0269887 A1* | 8/2023 | Kim | H05K 5/0247 |
| | | | 361/807 |
| 2024/0090152 A1* | 3/2024 | Gong | H05K 5/061 |
| 2025/0107017 A1* | 3/2025 | Li | G09F 9/33 |

FOREIGN PATENT DOCUMENTS

| | | | |
|---|---|---|---|
| DE | 102017210938 A1 | 1/2019 | |
| EP | 3029657 A1 | 6/2016 | |
| EP | 2938510 B1 | 8/2019 | |
| WO | WO-2014102467 A1 * | 7/2014 | B60K 35/50 |

OTHER PUBLICATIONS

European Search Report dated Jan. 24, 2024 from corresponding European Application No. 23191454.0.

Office Action dated May 4, 2023 from corresponding German patent application No. 10 2022 209 810.2.

Kugelmann, Kapitel 1, Einsatz nachgiebiger Elemente zur wirtschaftlichen Automatisierung von Produktionssystemen, Springer-Verlag Berlin Heidelberg, 1993, pp. 1-13.

Abele, Entwicklung von Teilsystemen zum passiven Toleranzausgleich, Gußputzen mit sensorgeführten, programmierbaren Handhabungsgeraten, Springer-Verlag, Berlin, Heidelberg, 1983, pp. 44-51.

Disse et al., Kleben und Hybridfugen von Leichtbaustrukturen für den Automobilbau, Adhäsion 7-8.04, pp. 14-19.

Frankenhauser, Entwicklung von Methoden zum Toleranzausgleich, Montage von Schläuchen mit Industrierobotern, Springer-Verlag, Berlin, Heidelberg, 1998, pp. 89-90.

Doebbel et al., Elastisches Kleben—Belastbare Verbindungstechnologie mit nützlichen Zusatzfunktionen, Ernst & Sohn Verlag für Architektur und technische Wissenschaften GmbH & Co. KG, Berlin, ce/papers 1 (2017), No. 1, pp. 153-167.

* cited by examiner

ELECTRONIC UNIT FOR A VEHICLE AND MANUFACTURING METHOD

CROSS REFERENCE TO RELATED APPLICATION

This U.S. patent application claims the benefit of German patent application No. 10 2022 209 810.2, filed Sep. 19, 2022, which is hereby incorporated by reference.

TECHNICAL FIELD

The disclosure concerns an electronic unit for a vehicle, comprising two or more surface elements arranged next to one another and with a visible surface side and an opposite surface underside, wherein the surface elements are each fixed in a housing, and wherein the housing has a housing top side facing the surface underside and an opposite housing underside, and wherein a carrier plate is provided, and wherein each housing on its housing underside has at least one protruding fixing element for fixing the surface elements to the carrier plate, wherein the carrier plate connects the two or more surface elements together. The disclosure furthermore concerns a manufacturing method for such an electronic unit, and a use thereof.

BACKGROUND

As part of the increasing use of displays in motor vehicles, often now no longer is only one single display fitted, for example as a display device for an instrument cluster, but a group of displays, usually three or more. In the case of these multiple displays, the individual displays in the dashboard of the vehicle are mounted level/flush with one another and act as a cohesive display strip.

The displays are often separately bonded, i.e. each has a glass plate. Furthermore, the individual displays, each bonded to a glass plate, are positioned in a common carrier plate, similar to a picture frame. The displays are usually mounted directly on the carrier plate by screws or clips. A flush appearance of the displays cannot however always be achieved, since the displays must be fitted in the carrier plate level with one another with little tolerance.

Fitting work is usually performed by industrial robots.

During adjustment by such robots, however, positioning inaccuracies occur; in particular, the surface elements are not oriented level with one another, which is perceptible and displeasing in particular in the case of visible surface elements fitted in the vehicle.

Also, the direct screwing or clipping of the displays into the carrier plate leads to larger tolerances which must be minimized for example by mechanical reworking, and hence at higher costs.

DE 10 2014 019293 A1 discloses an electronic unit for a motor vehicle, comprising: a carrier element, a display module arranged on the carrier element, and at least one mechanical connecting element which connects the display module and the carrier element together, wherein the at least one mechanical connecting element has at least one latching mechanism.

EP 3029657 A1 discloses a multivision display system comprising the following: a plurality of displays, and at least one frame which is configured to carry the plurality of displays such that they stand on a horizontal face, wherein the frame comprises: a base which is configured such that it is carried by the horizontal face; and a plurality of coupling frames which are configured to carry the plurality of displays and are coupled to one another so as to set the relative positions of the plurality of displays.

SUMMARY

It is an object of the disclosure to indicate an electronic unit for a vehicle, comprising two or more surface elements which are arranged next to one another and level with one another. It is a further object of the disclosure to indicate a method for manufacturing such an electronic unit, and a use thereof.

These objects are achieved by an electronic unit having the features of claim 1 and by a method having the features of claim 11. Furthermore, the object is achieved by a use having the features of claim 15. Preferred embodiments of the invention are the subject of the dependent claims.

This object is achieved by an electronic unit for a vehicle, comprising two or more surface elements arranged next to one another and with a visible surface side and an opposite surface underside, wherein the surface elements are each fixed in a housing, and wherein the housing has a housing top side facing the surface underside and an opposite housing underside, and wherein a carrier plate is provided, and wherein each housing on its housing underside has at least one protruding fixing element for fixing the surface elements to the carrier plate, wherein the carrier plate connects the two or more surface elements together, and wherein each fixing element has an index element which is arranged on the fixing element between the carrier plate and the housing underside and is releasably connected to the fixing element by force fit and/or form fit, and wherein the index elements are connected to the carrier plate by substance bonding so that each surface element is separately releasably fixed to the carrier plate, and wherein by the index elements, the surface elements are arranged relative to and level with one another.

The fixing elements are for example screws which are screwed on the back through the housing underside, pointing away from the housing underside and the surface elements, and protrude from the housing underside. In other words, the screws point away from the housing underside.

The provision of index elements may create a tolerance compensation, whereby the at least two surface elements may be arranged level with one another.

Furthermore, such a carrier plate has for example a central web in which the surface elements are arranged. The electronic unit according to the disclosure thus allows the surface elements to be arranged not only level with one another but also level with the central web or adjacent components.

Thanks to the electronic unit and the index elements, an inseparable connection between the carrier plate and surface elements may be avoided; the index elements create a releasable connection to the fixing elements, e.g. via a screw connection. The sometimes costly surface elements may thus be replaced separately from one another. Furthermore, the substance-bonded connection to the carrier plate may provide the required stability.

Before connection by substance bonding, a precise alignment may be achieved by the index elements before the fixing, e.g. via an adhesive as the substance-bonded connection.

The additional index elements allow surface elements, which must be mounted and oriented relative to one another, to be oriented relative to one another in all degrees of freedom.

Thus despite the additional index elements, the costs of such an electronic unit are lower than those of additional reworking steps on the housing, e.g. a metal housing.

According to one aspect of the disclosure, the index elements have a central recess. Furthermore, the fixing elements may be configured as elongate mounting elements, and the index elements may be push-fitted onto the mounting elements.

According to a further aspect, the index elements are rotatably mounted on the mounting elements. Thus a simple releasable connection may be produced.

In particular, the fixing elements may be configured as screws or screw-like mounting elements, and the index elements each have an annular recess for receiving the screw or screw-like mounting element so that the index elements and the fixing elements form a releasable screw connection.

Thus the surface elements may be mounted on the index elements by simple screwing or for example by a press fit. Furthermore, the surface elements may be detached easily and separately. Thus despite the substance-bonded connection between the index elements and the carrier plate, e.g. by gluing, a capacity for reworking is achieved since the screw connection may be opened.

In a further embodiment, the index elements and the carrier plate are bonded together by an adhesive as a substance-bonded connection, wherein the carrier plate has corresponding passages for passage of the adhesive onto the index elements. The adhesive allows a simple substance-bonded connection.

According to a further aspect of the disclosure, the index elements have a central recess for receiving the fixing elements, and the index elements, between the carrier plate, have undercuts and/or cutouts pointing away from a recess edge for receiving the adhesive, whereby in addition to the substance-bonded connection, a mechanical fixing of the carrier plate to the index elements is possible.

Thus the adhesive flows through the passages in the carrier plate between the undercuts and cutouts, and therefore achieves an improved substance-bonded adhesion between the carrier plate and the index elements. In addition to the adhesive connection, the undercuts and cutouts therefore achieve a mechanical fixing, also known as "adhesive riveting".

In particular, the index elements may be configured as round index plates with round recesses for receiving the fixing elements. Thus an even bonding and fixing to the carrier plate may be achieved.

In a further embodiment, the surface elements are configured as displays and the housing is configured as a display housing. Here, these displays may be arranged in the cockpit for control and as a multimedia display. Furthermore, the displays may each be optically bonded to a glass plate and have an LED backlight in the housing. In particular, mutually level orientation is also important in OLED technology. The resulting level orientation of the displays may avoid an "undulating" impression because of positioning inaccuracies.

Furthermore, according to a further aspect of the disclosure, the index elements may be configured as plastic injection moldings. These are cheap to manufacture.

The object is furthermore achieved by a method for manufacturing an electronic unit with two or more surface elements arranged next to one another and with a visible surface, for a vehicle, comprising the steps:

provision of two or more surface elements arranged next to one another on a first device and with a visible surface side and an opposite surface underside, wherein the surface elements are each fixed in a housing, and wherein the housing has a housing top side facing the surface underside and an opposite housing underside, and wherein each housing on its housing underside has at least one protruding fixing element for fixing the surface elements to a carrier plate which connects the two or more surface elements together, releasable connection of the fixing elements to a respective index element by force fit and/or form fit, adjustment of the surface elements in a first position relative to one another and to the first device, so that the individual surface elements are arranged level with one another, and freezing of the position of the surface elements in the first adjusted position on the first device, adjustment of the carrier plate relative to the housings with the surface elements by orientation points on the surface elements and/or the housings, and also adjustment of the carrier plate relative to the index elements by a second device so that at least one air gap is present between the carrier plate and the respective index elements, substance-bonded connection of the index elements to the carrier plate so that the air gap is at least partially closed by the substance-bonded connection, so that each surface element is separately releasably fixed to the carrier plate, and wherein by the index elements, the surface elements can be adjusted relative to and level with one another.

Here, the advantages of the electronic unit may also be transferred to the method. In particular, an electronic unit as described above may be manufactured using the method.

The second device may achieve orientation of the carrier plate using orientation points, for example of the glass contour face, in all directions e.g. in the X, Y, Z directions, and freezing of this position.

The surface elements to be mounted and oriented relative to one another have separate index elements, using which the surface elements may be oriented relative to one another in all degrees of freedom and fixed on the first device.

The mounting of multiple such index elements may provide a tolerance compensation, whereby the at least two surface elements may be arranged level with one another.

Thus there is no need to fix multiple surface elements using screws or clips, which usually takes place directly on the carrier plate, e.g. a base plate. This also avoids the larger tolerances resulting from direct screwing or clipping of the surface elements into the carrier plate, and which must be minimized for example by mechanical reworking and hence with higher costs.

Furthermore, the first device may also orient the surface elements relative to the components adjacent to the surface elements, i.e. for example a robot system aligns the surface elements to the adjacent components using the index elements (Gap).

In a further embodiment, the index elements are releasably connected, for example screwed or press-fitted, to the fixing elements.

By the second device, e.g. a robot system, the carrier plate may be oriented to the index elements such that a gap is created between the index elements and the carrier plate (Flus), in which for example an adhesive is applied as a substance-bonded connection by a gluing robot.

Furthermore, according to a further aspect of the disclosure, the index elements and the carrier plate are bonded together by an adhesive as a substance-bonded connection, wherein the carrier plate has corresponding passages for passage of the adhesive onto the index elements, and wherein the index elements have a central recess for receiving the fixing elements, and wherein the index elements have undercuts and/or cutouts pointing away from a recess edge for receiving the adhesive, whereby in addition to the substance-bonded connection, a mechanical fixing of the carrier plate to the index elements is possible.

Also, according to a further aspect of the disclosure, the index elements may be annular and have a central recess, wherein the fixing elements are configured as elongate screws or screw-like mounting elements, and the index elements are screwed onto the screws or screw-like mounting elements so that a releasable screw connection is formed between the index elements and the fixing elements.

According to a further aspect of the disclosure, the index elements may be rotatably mounted on the fixing elements.

The object is furthermore achieved by a use of the method as described above for manufacturing a display device with multiple mutually adjacent displays as surface elements, wherein the housing is configured as a display housing and wherein the displays are each optically bonded to a glass plate.

BRIEF DESCRIPTION OF THE DRAWINGS

Further properties and advantages of the present disclosure will become apparent from the following description with reference to the accompanying figures, in which, schematically.

DETAILED DESCRIPTION

Figure 1:
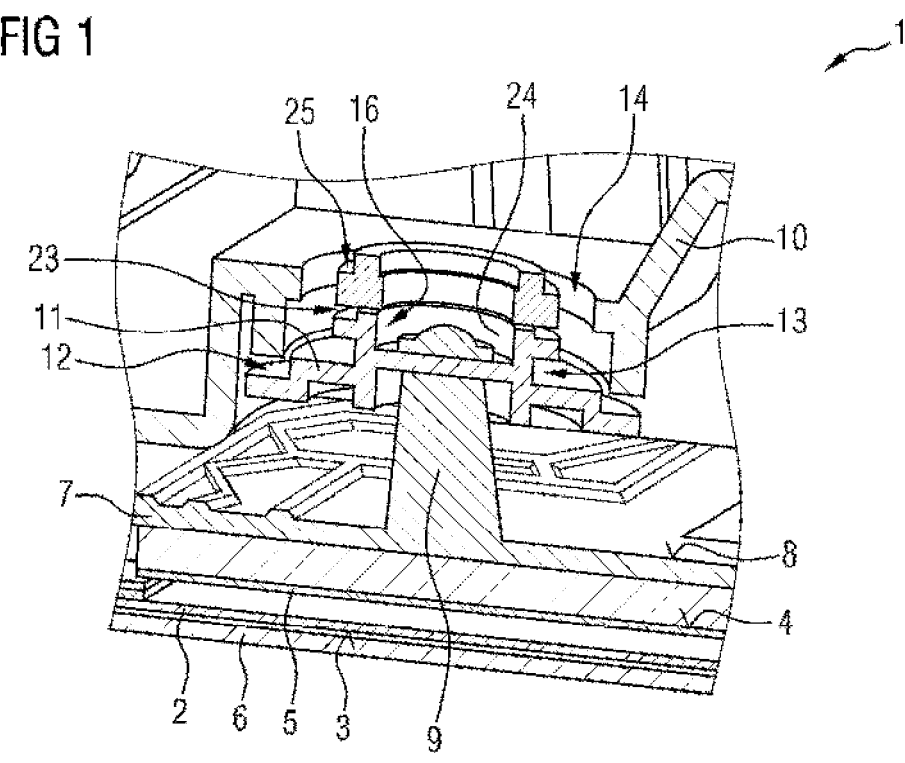
FIG. 1: shows an extract of an electronic unit according to the disclosure.

FIG. 1 shows an extract of an electronic unit 1 for a vehicle during mounting.

The electronic unit 1 has two or more surface elements to be arranged next to one another, which are here configured as displays 2. The displays 2 each have a visible surface side 3 and an opposite surface underside 4.

A so-called LED backlight 5 is arranged on the surface underside 4; alternatively, the display may also be configured as an OLED (Organic Light Emitting Diode), whereby an LED backlight 5 may be omitted since an OLED display in principle consists of a single layer. Each of the displays 2 may be bonded to a glass plate 6.

Furthermore, each housing 7 is provided with a housing underside 8. The housing 7 is configured to receive the individual displays 2 with the LED backlight 5 and any components in-between, and fixes the individual displays 2 and also the glass plates 6. Fixing elements, here configured as screws 9 protruding from the housing underside 8, are provided on the housing underside 8.

Furthermore, a carrier plate 10 is provided, on which the housing 7 is to be fixed.

Here, the displays 2 are oriented level with one another and closely fitting on a first device, e.g. a movable table with robot arm.

The robot system orients the housing 7 with the displays 2 also relative to the adjacent components of the housing 7 and the displays 2.

When the housing 7 and displays 2 are oriented correctly relative to one another and also to the adjacent elements/parts, this state or this position is fixed or frozen.

Furthermore, index plates 11 are screwed onto the screws 9. The screw connection creates a releasable connection between the screws 9 and the index plates 11.

The index plates 11 have a continuous annular recess 16 arranged centrally, for example with an external thread for screwing onto the screws 9. The index plates 11 are screwed onto each of the screws 9.

The index plates 11 may be substantially cylindrical or circular with a certain height.

Also, the index plates 11 have cutouts 12 and undercuts 13 pointing away from a recess edge 24 and pointing toward the carrier plate 10 to be fitted later.

The index plates 11 may be configured as plastic injection moldings, and the housing 7 may be made from a die casting. The index plates 11 with the housing 7 and screws 9 effectively serve as receivers for the displays 2.

Then the carrier plate 10 is oriented at orientation points in all directions, here for example the X, Y, Z directions. Such orientation points may for example each comprise the glass contour face of the glass plate 6.

This may be carried out by a second device, e.g. a second robot arm or robot system.

The robot system orients the carrier plate 10 relative to the index elements 11. The robot system orients the carrier plate 10 such that small air gaps 23 are present between the carrier plate 10 and the index elements 11 or the surface of each index element 11, thus allowing orientation in all degrees of freedom.

When the robot system has oriented the carrier plate 10 in all degrees of freedom in this way and also such that air gaps 23 are present between each surface of each index element 11 and the carrier plate 10, this position is frozen.

The gluing robot then applies an adhesive 15.

The carrier plate 10 here has corresponding passages 14 for passage of the adhesive 23 onto the index plates 11.

Figure 2:
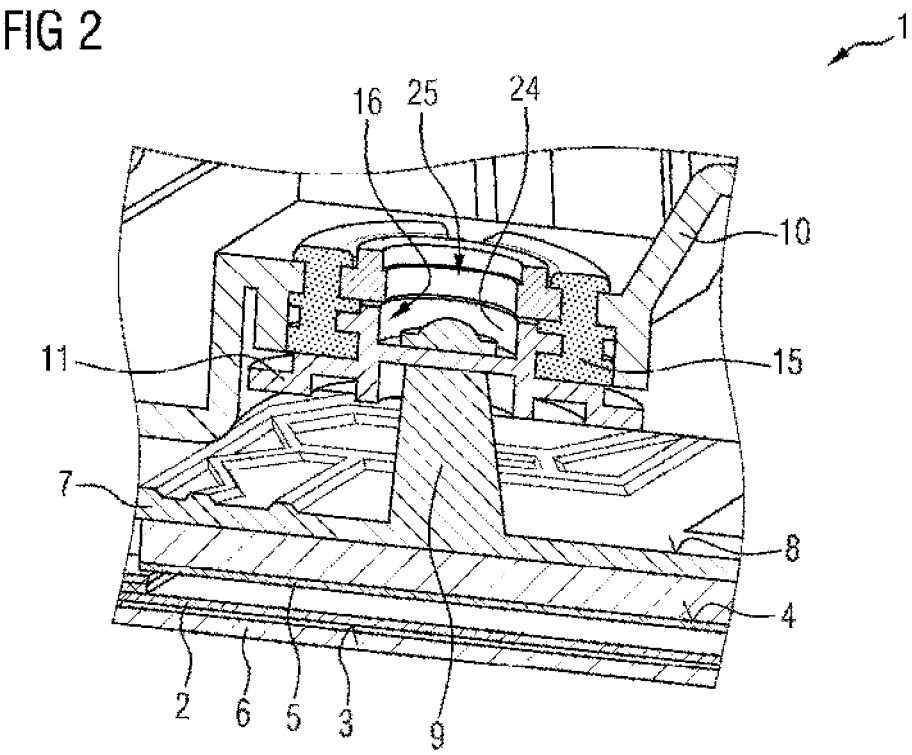
FIG. 2: shows a carrier plate with the index plates.

FIG. 2 shows a carrier plate 10 with the index plates 11 and an adhesive 15.

On application, the adhesive 15 flows through the passages 14 through the carrier plate 10 into the air gaps 23 present between the index plates 11 and carrier plate 10, and onto the surface of the index plates 11, and thus bonds the index plates 11 and carrier plate 10 together.

In this way, the index plates 11 and carrier plate 10 are connected together by substance bonding, while the index plates 11 and housing 7 are connected by the screw connection, whereby a releasable force-fit connection is created between the screws 9 and the index plates 11.

Furthermore, the adhesive 15 flows into the undercuts 13 and cutouts 12 of the index plates 11 as "adhesive riveting", so that in addition to the substance-bonded connection, the carrier plate 10 can be mechanically fixed to the index plates 11.

In particular, each housing 7 with a display 2 fixed therein comprises several such screws 9.

Furthermore, the carrier plate 10 may have depressions 25 into which the screws 9 may protrude without being fixed/connected to the carrier plate 10.

Figure 3:
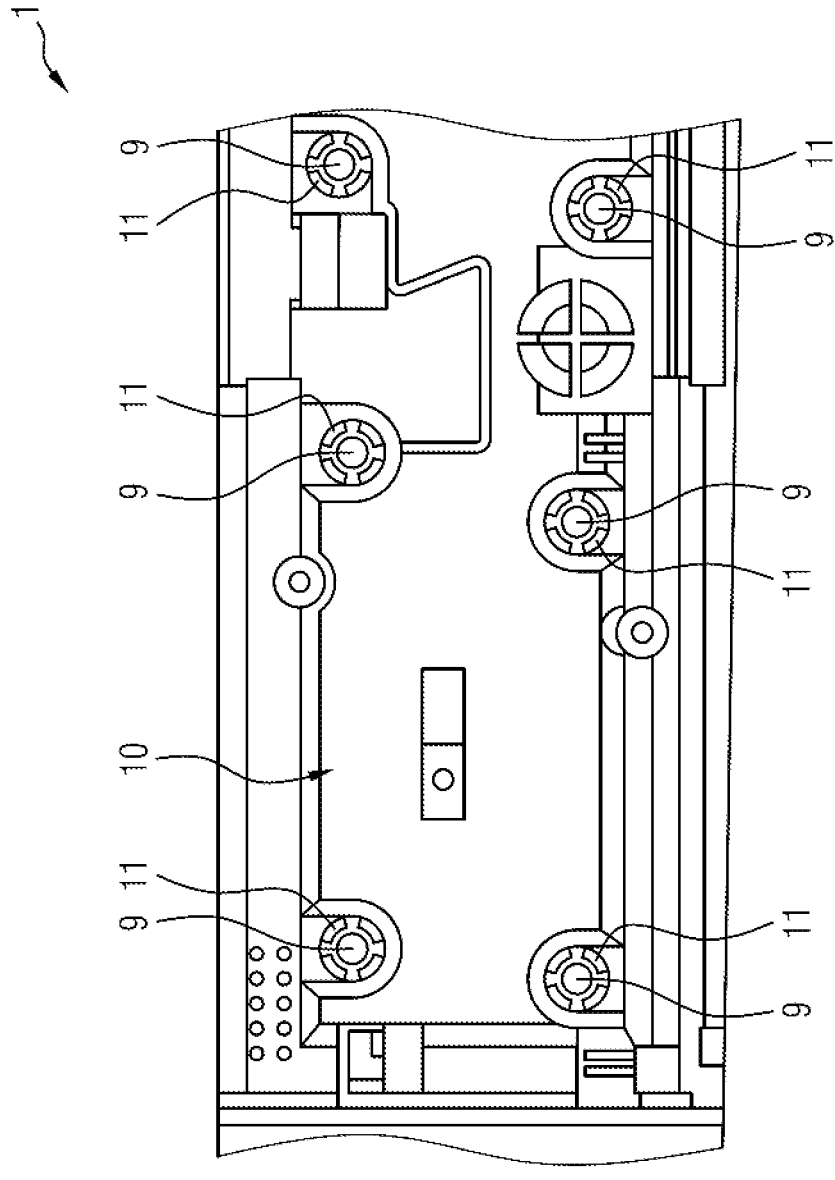
FIG. 3: shows the electronic unit viewed from the carrier plate.

FIG. 3 shows an electronic unit 1 viewed from the carrier plate.

Multiple screws 9 are present, each having an index plate 11. The number may vary depending on the size of the respective displays 2.

Figure 4:
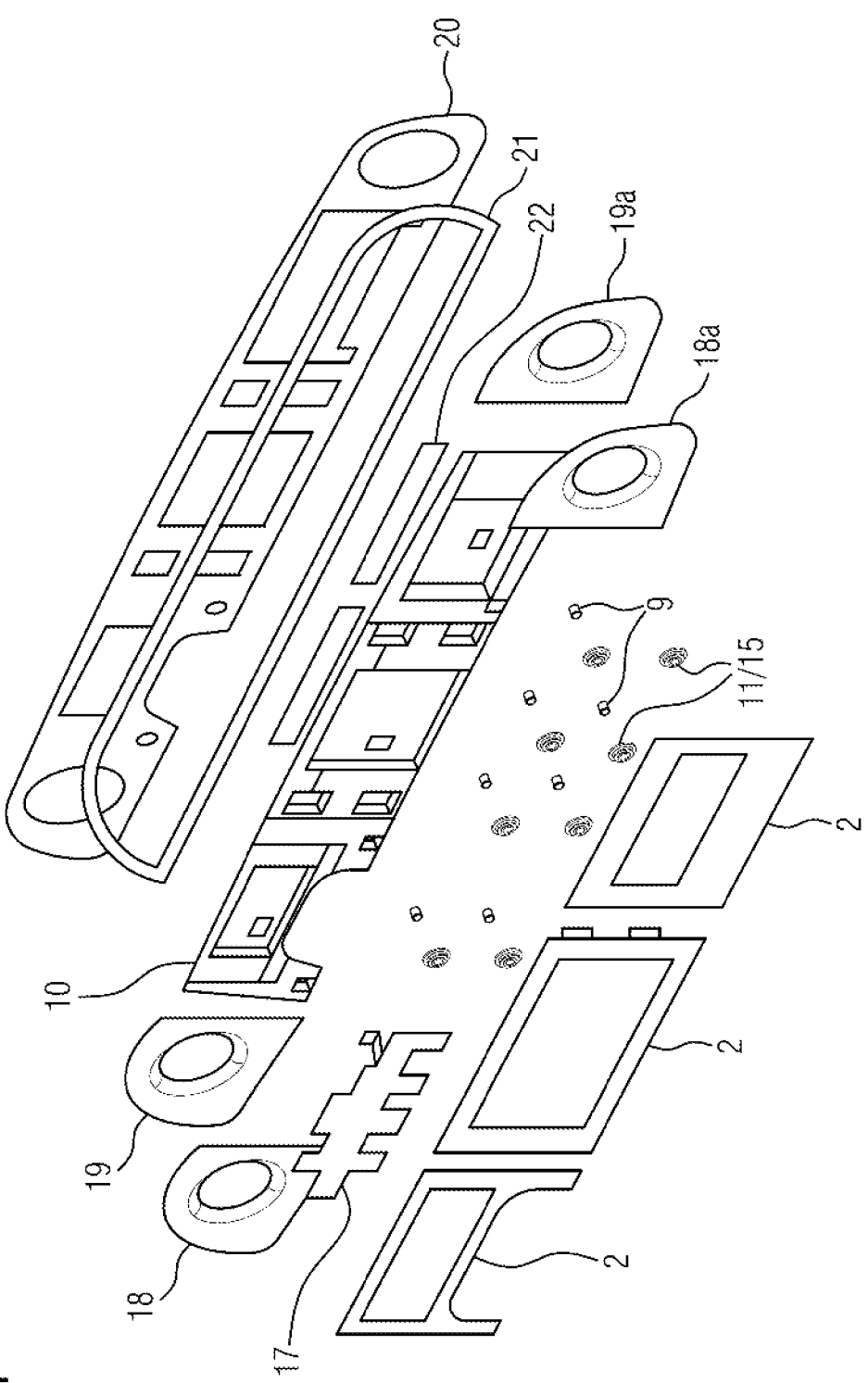
FIG. 4: shows a display arrangement.

FIG. 4 shows an exploded view of such a display arrangement with multiple displays 2 arranged next to one another.

There are three displays 2 each with an LED backlight 5 (FIG. 2) and a glass plate 6 (FIG. 2), in each case arranged in a housing 7 (FIG. 2). Multiple screws 9 are attached to each housing 7 (FIG. 2).

A carrier plate 10 is also provided. Furthermore, a crash kinematic plate 17 is provided between the carrier plate 10 and the display 2 with housing 7.

Also, as adjacent components, a left vent 18 and a right vent 18*a* are provided which are each arranged in a structure 19, 19*a*.

The carrier plate 10 may be arranged on a back cover 20 with a sticker 21 and thermal gap filler 22.

Furthermore, index plates 11 are provided which are fixed to the carrier plate 10 by adhesive 15 as substance bonding and mechanically by adhesive riveting, and are releasably attached to the display 2 or housing 7 by the screw connection.

Despite the additional index plates 11, because of a planar-parallel orientation of the displays 2 relative to one another and also to the surrounding components, here the vents 18, 18*a*, the costs are lower than for additional reworking steps on the housing 7.

The tolerances, which are provided by the carrier plate 10 or display 2, housing 7, etc. because of the manufacturing process, are reflected in the air gap 23 (FIG. 1) between the carrier plate 10 and index plates 11, i.e. this air gap 23 (FIG. 1) may vary in its extent depending on the tolerance situation. Moreover, despite bonding, there is capacity for reworking since the screw connections may be opened and the displays 2 each removed separately. Furthermore, the method may be used in all products in which surfaces/devices/components must be oriented relative to one another.

The invention claimed is:

1. An electronic unit for a vehicle, comprising:
   two or more surface elements arranged next to one another and with a visible surface side and an opposite surface underside,
   wherein the surface elements are each fixed in a housing, and
   wherein the housing has a housing top side facing the surface underside and an opposite housing underside, and
   wherein a carrier plate is provided, and wherein each housing on its housing underside has at least one protruding fixing element for fixing the surface elements to the carrier plate,
   wherein the carrier plate connects the two or more surface elements together,
   wherein each fixing element has an index element which is arranged on the fixing element between the carrier plate and the housing underside and is releasably connected to the fixing element by force fit and/or form fit and secured to the fixing element by a screw accessible via a recess through the carrier plate in which the index element is at least partially arranged,
   wherein the index elements are connected to the carrier plate by substance bonding so that each surface element is separately releasably fixed to the carrier plate,
   wherein the index elements have cutouts pointing away from a recess edge configured as circumferential channels that receive an adhesive for a mechanical fixing of the carrier plate to the index elements, and
   wherein by the index elements, the surface elements are arranged relative to and level with one another.

2. The electronic unit as claimed in claim 1, wherein the index elements have a central recess and the fixing elements are configured as elongate mounting elements, and the index elements are push-fitted onto the mounting elements.

3. The electronic unit as claimed in claim 2, wherein the index elements are rotatably mounted on the mounting elements.

4. The electronic unit as claimed in claim 2, wherein the fixing elements are configured as screws or screw-like mounting elements, and the index elements each have an annular recess for receiving the screw or screw-like mounting element so that the index elements and the fixing elements form a releasable screw connection.

5. The electronic unit as claimed in claim 1, wherein the index elements and the carrier plate are bonded together by the adhesive as a substance-bonded connection, wherein the carrier plate has corresponding passages for passage of the adhesive onto the index elements.

6. The electronic unit as claimed in claim 5, wherein the index elements have a central recess for receiving the fixing elements.

7. The electronic unit as claimed in claim 6, wherein the index elements are configured as round index plates with round recesses for receiving the fixing elements.

8. The electronic unit as claimed in claim 5, wherein the index elements have undercuts pointing away from the recess edge for receiving the adhesive.

9. The electronic unit as claimed in claim 1, wherein the surface elements are configured as a display and the housing is configured as a display housing.

10. The electronic unit as claimed in claim 1, wherein the index elements are configured as plastic injection moldings.

11. A method for manufacturing an electronic unit with two or more surface elements arranged next to one another and with a visible surface, for a vehicle, comprising the steps:
   provisioning two or more surface elements arranged next to one another on a first device and with a visible surface side and an opposite surface underside, wherein the surface elements are each fixed in a housing, and wherein the housing has a housing top side facing the surface underside and an opposite housing underside, and wherein each housing on its housing underside has at least one protruding fixing element for fixing the surface elements to a carrier plate which connects the two or more surface elements together;
   having releasable connection of the fixing elements to a respective index element by force fit and/or form fit; adjusting of the surface elements in a first position relative to one another and to the first device, so that the surface elements are arranged level with one another, and freezing of the position of the surface elements in the first adjusted position on the first device;
   adjusting of the carrier plate relative to the housings with the surface elements by orientation points on the surface elements and/or the housings, and also adjustment of the carrier plate relative to the index elements by a second device so that at least one air gap is present between the carrier plate and the respective index elements;
   and having substance-bonded connection of the index elements to the carrier plate so that the air gap is at least partially closed by means of the substance-bonded connection, so that each surface element is separately releasably fixed to the carrier plate, and wherein by the index elements, the surface elements can be adjusted relative to and level with one another and securing the index element to the fixing element by a screw accessible via a recess through the carrier plate in which the index element is at least partially arranged;

bonding the index elements and the carrier plate together by an adhesive as a substance-bonded connection, wherein the index elements have cutouts pointing away from a recess edge configured as circumferential channels that receive the adhesive for a mechanical fixing of the carrier plate to the index elements.

12. The method as claimed in claim 11, wherein the first device also orients the surface elements relative to the components adjacent to the surface elements.

13. The method as claimed in claim 11, wherein the carrier plate has corresponding passages for passage of the adhesive onto the index elements, and wherein the index elements have a central recess for receiving the fixing elements, wherein the index elements have undercuts pointing away from the recess edge for receiving the adhesive.

14. The method as claimed in claim 11, wherein the index elements are annular and have a central recess, and the fixing elements are configured as screws or screw-like mounting elements, and the index elements are screwed onto the screws or screw-like mounting elements so that a releasable screw connection is formed between the index elements and the fixing elements.

15. The method as claimed in claim 11, wherein the index elements are rotatably mounted on the fixing elements.

16. The method as claimed in claim 11, wherein the surface elements are a display device with multiple mutually adjacent displays, wherein the housing is configured as a display housing, and wherein the multiple mutually adjacent displays are each optically bonded to a glass plate.

\* \* \* \* \*